United States Patent [19]
Palmer

[11] 3,833,865
[45] Sept. 3, 1974

[54] HEART SIMULATOR
[76] Inventor: Euple I. Palmer, Rt. 3, Box 51, Huntsville, Ala. 35806
[22] Filed: Aug. 27, 1973
[21] Appl. No.: 391,712

[52] U.S. Cl. ........ 331/117 R, 128/2.06 R, 331/111, 331/166, 331/174
[51] Int. Cl. ............................................. H03b 5/12
[58] Field of Search ............ 128/2.06 R; 331/117 R, 331/111, 166, 173, 174

[56] References Cited
UNITED STATES PATENTS

| | | | |
|---|---|---|---|
| 2,870,332 | 1/1959 | Mills | 331/166 |
| 3,323,068 | 5/1967 | Woods | 328/187 |
| 3,469,115 | 9/1969 | Partridge | 128/2.06 R |
| 3,601,714 | 8/1971 | Vespie | 331/111 |

OTHER PUBLICATIONS
Radio–Electronics, Pg. 44, Sept. 1970.

Primary Examiner—John Kominski
Attorney, Agent, or Firm—George J. Porter; L. D. Wofford, Jr.; John R. Manning

[57] ABSTRACT

An electronic circuit which generates an electric waveform which is similar to that produced by the human heart. The circuit simulates the heart pulse rate over a range of approximately 40–200 pulse beats per second. A unijunction transistor oscillator generates pulses at a rate determined by the setting of a potentiometer and the pulses are shaped to simulate a heart beat by a transformer - RC circuit coupled to the oscillator output.

4 Claims, 2 Drawing Figures

HEART SIMULATOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to electric waveform generators and more particularly to electronic circuits which simulate the waveform produced by a human heart beat.

Heart monitoring equipment is widely used to display and/or record the electrical waveforms produced by a human heart. When it is necessary to calibrate or test the equipment, it must be connected either to a live human subject or to some device which simulates the signals which would be produced by the human subject. There are many obvious advantages to using a simulating device instead of a human subject, such as the ready accessibility of the device at any time, the ease and speed with which the connections can be made, etc. Another advantage is that the device can produce a standard, reproducible wave every time it is used, while there are large variations in the waveforms produced by different people, as well as variations in a particular individual caused by such variables as body impedance and electrode contact.

A number of devices for simulating the heart beat waveform have been developed. They can generally be divided into two classes; mechanical simulators and electrical simulators. Mechanical simulators have many disadvantages. They are large and bulky, expensive, and have high maintenance costs. It is often difficult to vary their repetition rates accurately and the waveforms often have a high noise content due to the noise inherent in mechanical movement.

Electrical simulators of the prior art suffer from the disadvantages of complex electronic circuitry. This complexity results in high costs for the devices, both as to original purchase price and to cost of repair. Also, the complexity of the circuitry tends to lessen reliability and to make adjustments and calibrations difficult.

SUMMARY OF THE INVENTION

According to the present invention, a heart simulator is provided which has none of the above noted disadvantages. A unijunction transistor oscillator produces a series of pulses with a variable repetition rate. The pulses are coupled to a waveshaping circuit including a transformer and a RC circuit which shapes the pulses to simulate those produced by a human heart.

The heart simulator of the present invention is completely electronic and has no moving parts. The circuitry is neither extensive nor complex, whereby the circuit is inexpensive, has high reliability, and is easy and inexpensive to repair.

Therefore, it is an object of the present invention to provide an electronic heart simulator which is inexpensive, reliable and has no complex circuitry.

It is another object of the present invention to provide an electronic circuit which generates a pulse useful for calibrating heart monitoring equipment.

BRIEF DESCRIPTION OF THE DRAWING

Other objects, advantages, and novel features of the present invention will become apparent from the following detailed description of the invention when considered in conjunction with the accompanying drawing in which.

DESCRIPTION OF THE PREFERRED EMBODIMENT

Figure 1:
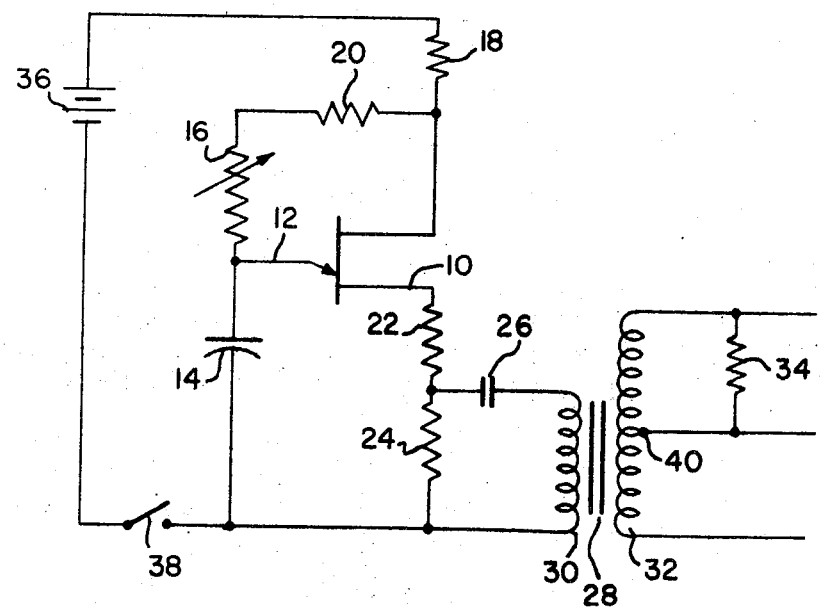
FIG. 1 shows a circuit diagram of a preferred embodiment of the invention.

Referring to FIG. 1, a unijunction transistor 10 has its emitter electrode 12 connected to the junction of capacitor 14 and potentiometer 16. A fixed resistor 20 is connected in series with the potentiometer. A source of DC voltage 36, such as a battery is connected to the UJT through OFF-ON switch 38. A resistor 18 is in series with source 36 and connected to base one of the UJT and resistor 20. Resistors 22 and 24 are connected in series between base two of the UJT and the negative terminal of source 36. The series combination of capacitor 26 and primary winding 30 of transformer 28 is connected in parallel to resistor 24. Transformer 28 has a secondary winding 32 with a tap 40. A resistor 34 is connected across part of the secondary winding.

In the circuit just described, the UJT 10 is biased to operate as a relaxation oscillator. That is, when switch 38 is closed and voltage from source 36 is applied across the circuit, emitter 12 is reverse-biased and hence non-conducting. As capacitor 14 is charged through resistors 16, 18 and 20, the emitter voltage rises towards the source voltage. When the emitter voltage reaches the peak point voltage, the emitter becomes forward biased and capacitor 14 discharges through the emitter and resistors 22 and 24 providing a pulse output. Varying the setting of potentiometer 16 changes the time constant of the charging circuit and hence varies the pulse repetition rate.

Since capacitor 26 and winding 30 are connected across resistor 24, the output pulse developed over 24 is applied across the series combination. Due to the inductance of winding 30, the entire voltage appears over it at the instant the pulse appears on resistor 24. As current begins to flow through winding 30, the voltage across it starts to drop and capacitor 26 starts to charge. Resistor 24, capacitor 26 and winding 30 comprise a highly damped LCR oscillation circuit; i.e., the energy stored in winding 30 is transferred to capacitor 26, and then back to winding 30, etc., through resistor 24 which dissipates enough energy to quickly damp the oscillations. The waveform produced across winding 30 is coupled to winding 32 and constitutes the simulated heart pulse. The transformer output is connected to heart monitoring equipment which is to be calibrated.

Figure 2:
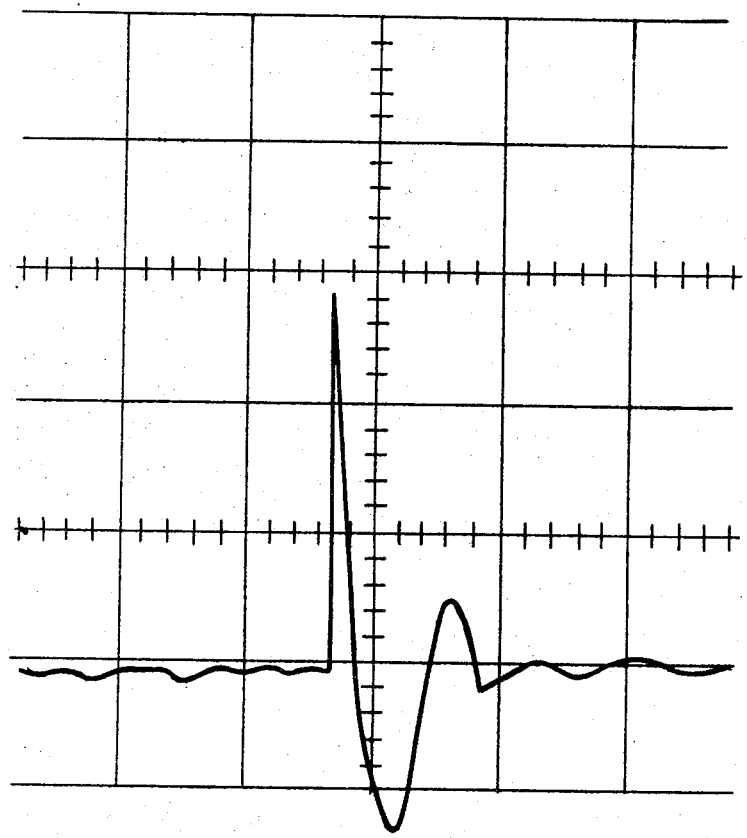
FIG. 2 shows the waveform obtained from the circuit of FIG. 1.

The circuit of FIG. 1 has been built and tested using elements of the following values:

| resistors | 18 | – | 150 | ohms |
|---|---|---|---|---|
| | 20 | – | 82 | K ohms |
| | 22 | – | 22 | ohms |
| | 24 and 34 | – | 4.7 | ohms |
| capacitors | 14 | – | 150 | mfd |
| | 26 | – | 8 | mfd | a 250 Kohm potentiometer was used for 16 and the source 36 was a 9v battery. The waveform obtained from this circuit is shown in FIG. 2. The similarity of this waveform to that produced by the human heart can clearly be seen. With these values, the pulse beat is variable over a range of approximately 40–200 pulses per minute.

Obviously, many modifications and variations of the present invention are possible in light of the above teachings. It is therefore to be understood that, within the scope of the appended claims, the invention may be practiced otherwise than as specifically described.

I claim:

1. An electronic heart simulator which generates a waveform similar to that produced by the human heart for calibrating heart monitoring equipment, comprising:
   a source of DC voltage;
   a unijunction transistor oscillator connected to the source, said oscillator including a resistor connected to the base two electrode of the unijunction transistor across which the oscillator output pulse appears;
   a series combination of a capacitor and an inductor connected across said resistor; and,
   a transformer, the primary winding of which constitutes said inductor, and the secondary winding of which comprises means for coupling the simulated waveform to the equipment which is to be calibrated.

2. The electronic heart simulator of claim 1 wherein said oscillator further includes means for varying its output pulse frequency.

3. The electronic heart simulator of claim 2 wherein said frequency varying means comprises a series combination of a capacitor and a potentiometer connected across the source and having its junction point connected to the emitter electrode of the unijunction transistor.

4. The electronic heart simulator of claim 3 wherein said DC source is a battery.

* * * * *